(12) United States Patent
Russo et al.

(10) Patent No.: US 11,823,212 B2
(45) Date of Patent: Nov. 21, 2023

(54) SYSTEM AND METHOD FOR GREENHOUSE GAS TRACKING

(71) Applicant: PITT-OHIO, Pittsburgh, PA (US)

(72) Inventors: Justine A. Russo, Pittsburgh, PA (US); Scott Sullivan, Pittsburgh, PA (US); Stephen Milcoff, Pittsburgh, PA (US); Dan Murcek, Pittsburgh, PA (US); Robert Sroufe, Gibsonia, PA (US)

(73) Assignee: PITT-OHIO Express, LLC, Pittsburgh, PA (US)

( * ) Notice: Subject to any disclaimer, the term of this patent is extended or adjusted under 35 U.S.C. 154(b) by 0 days.

(21) Appl. No.: 17/749,535

(22) Filed: May 20, 2022

(65) Prior Publication Data
US 2023/0103187 A1 Mar. 30, 2023

Related U.S. Application Data

(60) Provisional application No. 63/248,183, filed on Sep. 24, 2021.

(51) Int. Cl.
G06Q 30/018 (2023.01)
(52) U.S. Cl.
CPC .................................. G06Q 30/018 (2013.01)
(58) Field of Classification Search
None
See application file for complete search history.

(56) References Cited

U.S. PATENT DOCUMENTS

| 7,813,970 | B1 * | 10/2010 | Brandwine | G06Q 30/0633 |
| | | | | 705/26.1 |
| 8,170,886 | B2 | 5/2012 | Luff | |
| 8,346,595 | B2 * | 1/2013 | Ben-Hamida | G06Q 10/08 |
| | | | | 705/400 |
| 8,843,238 | B2 | 9/2014 | Wenzel et al. | |
| 9,390,391 | B2 | 7/2016 | Dembo | |
| 2007/0179683 | A1 | 8/2007 | Okeke | |
| 2009/0055232 | A1 * | 2/2009 | Bruno | G06Q 10/08 |
| | | | | 700/229 |

(Continued)

FOREIGN PATENT DOCUMENTS

| WO | WO-2021050162 A1 * | 3/2021 | ............ B60W 10/06 |
| WO | 2021195006 | 9/2021 | |

OTHER PUBLICATIONS

Funk, Carbon Footprinting: an Investor Toolkit, Sep. 30, 2020.

*Primary Examiner* — Jan P Mincarelli
(74) *Attorney, Agent, or Firm* — CALDWELL INTELLECTUAL PROPERTY LAW

(57) ABSTRACT

In an aspect, an apparatus for greenhouse gas tracking is presented. An apparatus includes at least a processor and a memory communicatively connected to the at least a processor. At least a processor is configured to receive a first set of greenhouse gas data from a first greenhouse gas source of a user of a plurality of users. At least a processor is configured to receive a second set of greenhouse gas data form a second greenhouse gas source of a user of a plurality of users. At least a processor is configured to determine a first greenhouse gas metric associated with a first greenhouse gas source. At least a processor is configured to determine a second greenhouse gas metric associated with a second greenhouse gas source. At least a processor is configured to calculate a greenhouse gas ratio.

20 Claims, 6 Drawing Sheets

(56) References Cited

U.S. PATENT DOCUMENTS

| | | | |
|---|---|---|---|
| 2009/0132176 A1* | 5/2009 | McConnell | G06Q 30/04 |
| | | | 702/23 |
| 2009/0292617 A1* | 11/2009 | Sperling | G06Q 30/06 |
| | | | 705/26.1 |
| 2013/0179078 A1 | 7/2013 | Griffon | |
| 2014/0249892 A1 | 9/2014 | Lobato Moreno et al. | |
| 2015/0134550 A1* | 5/2015 | Sroufe | G06Q 30/018 |
| | | | 705/317 |
| 2017/0351978 A1* | 12/2017 | Bellowe | G06Q 50/01 |
| 2018/0012233 A1* | 1/2018 | Steigler | G06Q 50/28 |
| 2021/0225528 A1 | 7/2021 | Viengkham et al. | |
| 2022/0067751 A1* | 3/2022 | Sanchez | G06Q 30/018 |
| 2022/0138636 A1* | 5/2022 | Gedeon | G06Q 50/14 |
| | | | 705/6 |
| 2022/0188856 A1* | 6/2022 | Leung | B60W 50/14 |
| 2022/0358515 A1* | 11/2022 | Kahn | G06Q 30/018 |

\* cited by examiner

SYSTEM AND METHOD FOR GREENHOUSE GAS TRACKING

CROSS-REFERENCE TO RELATED APPLICATIONS

This application claims the benefit of priority of U.S. Provisional Patent Application Ser. No. 63/248,183, filed on Sep. 24, 2021 entitled "SYSTEM AND METHOD FOR CARBON EMISSION TRACKING", which is incorporated by reference herein in its entirety.

FIELD OF THE INVENTION

The present disclosure is generally directed towards a system and method for greenhouse gas tracking. Specifically, the present system and method is direct to calculating and tracking a carbon footprint in a logistics context.

BACKGROUND

For many manufacturers a significant portion of their true carbon footprint lies in the supply chains feeding materials and distributing products. Specifically, one of the largest contributors of carbon for many manufacturers carbon footprint comes from the logistics services required to properly position materials and finished products in global supply chains. Despite the relatively large contribution of transportation to an overall carbon footprint, one of the major hurdles to tracking supply chain emissions is the lack of standardization for emissions reporting. Thus, systems and methods for calculating and reporting carbon emissions associated with the logistics industry and with freight movement in general can be improved.

SUMMARY OF THE DISCLOSURE

In an aspect, an apparatus for greenhouse gas tracking is presented. An apparatus includes at least a processor and a memory communicatively connected to the at least a processor. A memory contains instructions configuring the at least a processor is configured to receive a first set of greenhouse gas data from a first greenhouse gas source of a user of a plurality of users. At least a processor is configured to receive a second set of greenhouse gas data form a second greenhouse gas source of a user of a plurality of users. At least a processor is configured to determine a first greenhouse gas metric associated with a first greenhouse gas source. At least a processor is configured to determine a second greenhouse gas metric associated with a second greenhouse gas source. At least a processor is configured to calculate, as a function of a first greenhouse gas metric and a second greenhouse gas metric, a greenhouse gas ratio.

In an aspect, a method of greenhouse gas tracking using a computing device is presented. A method includes receiving a first set of greenhouse gas data from a first greenhouse gas source. A method includes receiving a second set of greenhouse gas data from a second greenhouse gas source. A method includes determining a first greenhouse gas metric associated with a first greenhouse gas source. A method includes determining a second greenhouse gas metric associated with a second greenhouse gas source. A method includes calculating, as a function of a first greenhouse gas metric and a second greenhouse gas metric, a greenhouse gas ratio.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Described herein is an apparatus for greenhouse gas tracking. An apparatus may include at least a processor and a memory communicatively connected to the at least a processor. A memory may contain instructions configured the at least a processor to receive a first set of greenhouse gas data from a first greenhouse gas source of a user of a plurality of users. At least a processor may be configured to receive a second set of greenhouse gas data form a second greenhouse gas source of a user of a plurality of users. At least a processor may be configured to determine a first greenhouse gas metric associated with a first greenhouse gas source. At least a processor may be configured to determine a second greenhouse gas metric associated with a second greenhouse gas source. At least a processor may be configured to calculate, as a function of a first greenhouse gas metric and a second greenhouse gas metric, a greenhouse gas ratio.

Described herein is a method of greenhouse gas tracking using a computing device. A method may include receiving a first set of greenhouse gas data from a first greenhouse gas source. A method may include receiving a second set of greenhouse gas data from a second greenhouse gas source. A method may include determining a first greenhouse gas metric associated with a first greenhouse gas source. A method may include determining a second greenhouse gas metric associated with a second greenhouse gas source. A method may include calculating, as a function of a first greenhouse gas metric and a second greenhouse gas metric, a greenhouse gas ratio.

Figure 1:
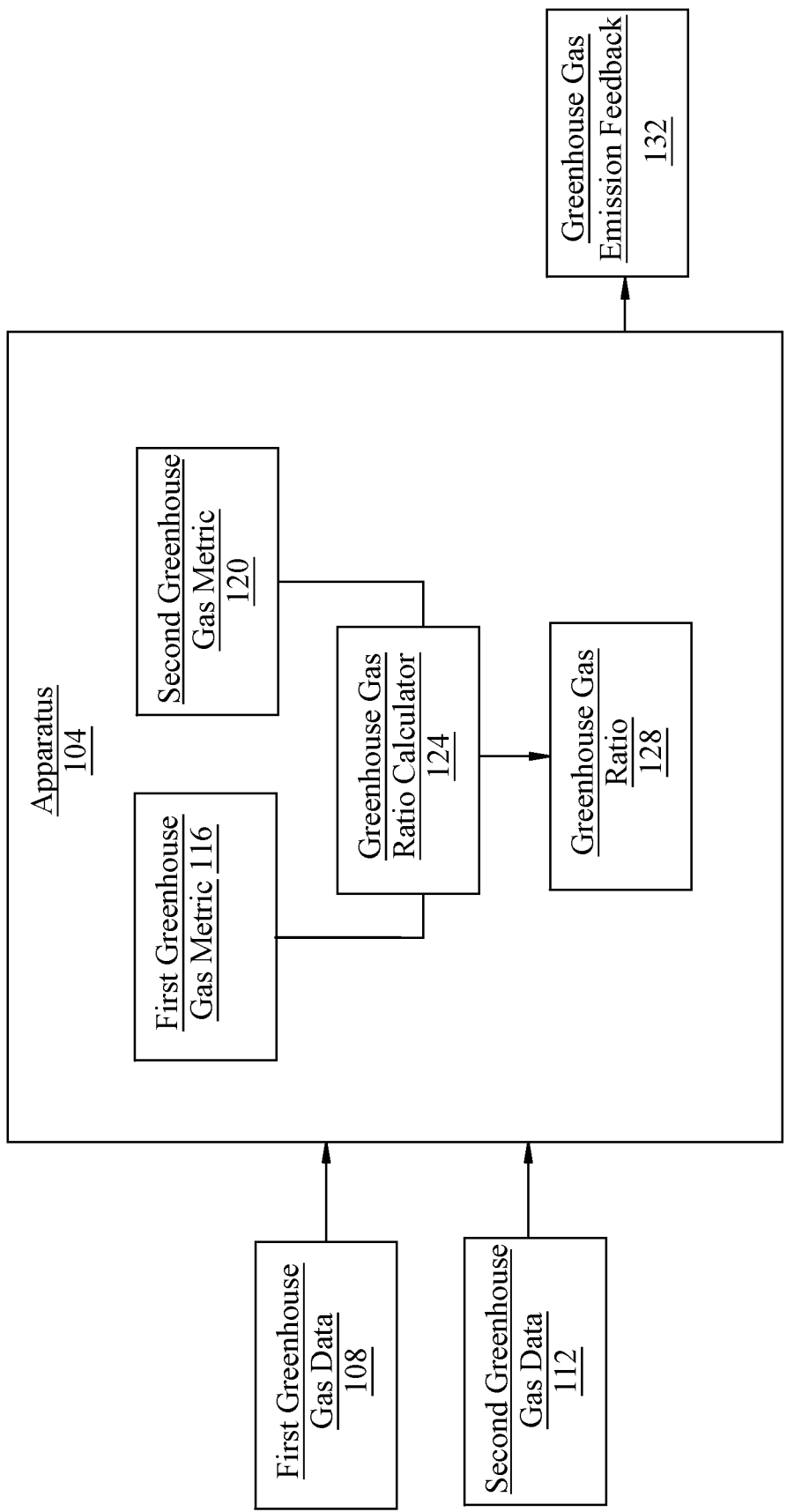
FIG. 1 is a block diagram illustrating an apparatus for greenhouse gas tracking.

Referring now to FIG. 1, an apparatus 104 for greenhouse gas tracking system is presented. Apparatus 104 may include at least a processor and a memory communicatively connected to the at least a processor. A memory may contain instructions configured the at least a processor to perform various tasks. Apparatus 104 may include a computing device, such as any computing device described throughout this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 104 may include any computing device as described in this disclosure, including without limitation a microcontroller, microprocessor, digital signal processor (DSP) and/or system on a chip (SoC) as described in this disclosure. Apparatus 104 may include, be included in, and/or communicate with a mobile device such as a mobile telephone or smartphone. Apparatus 104 may include a single computing device operating independently, or may include two or more computing device operating in concert, in parallel, sequentially or the like; two or more computing devices may be included together in a single computing device or in two or more computing devices. Apparatus 104 may interface or communicate with one or more additional devices as described below in further detail via a network interface device. Network interface device may be utilized for connecting apparatus 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or apparatus 104. Apparatus 104 may include but is not limited to, for example, a computing device or cluster of computing devices in a first location and a second computing device or cluster of computing devices in a second location. Apparatus 104 may include one or more computing devices dedicated to data storage, security, distribution of traffic for load balancing, and the like. Apparatus 104 may distribute one or more computing tasks as described below across a plurality of computing devices of computing device, which may operate in parallel, in series, redundantly, or in any other manner used for distribution of tasks or memory between computing devices. A computing device may be implemented using a "shared nothing" architecture in which data is cached at the worker, in an embodiment, this may enable scalability of a system and/or computing device.

With continued reference to FIG. 1, apparatus 104 may be designed and/or configured to perform any method, method step, or sequence of method steps in any embodiment described in this disclosure, in any order and with any degree of repetition. For instance, apparatus 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 104 may be configured to receive first greenhouse gas data 108. Apparatus 104 may receive first greenhouse gas data 108 through an external computing device, user input, and the like. In some embodiments, apparatus 104 may receive first greenhouse gas data 108 through one or more computing devices and/or sensors. "Greenhouse gas data" as used in this disclosure is a metric associated with a pollutant that contributes to the greenhouse effect. A "pollutant" as used in this disclosure is a substance that degrades environmental quality. In some embodiments, first greenhouse gas data 108 may include, but is not limited to, carbon emissions, water vapor, methane, nitrous oxide, ozone, chlorofluorocarbons, hydrofluorocarbons, perfluorocarbons, and the like. First greenhouse gas data 108 may include measurements associated with an amount of greenhouse gas generated. An amount of greenhouse gas generated may be represented in, but is not limited to, metric tons, pounds, kilograms, cubic meters, and the like. As a non-limiting example, first greenhouse gas data 108 may include data showing 4 metric tons of carbon have been generated by a user. In some embodiments, first greenhouse gas data 108 may include data from one or more pollutant sources. A "pollutant source" as used in this disclosure is any originating source of a pollutant. A pollutant source may include, but is not limited to, transport vehicles, power grids, combustion from boilers, furnaces, transport vehicle emissions, emissions from processes performed by or products manufactured by a transport vehicle, and the like. A "transport vehicle" as used in this disclosure is a machine capable of moving one or more objects between one or more locations. In some embodiments, a transport vehicle may include, but is not limited to, a freight carrier, a truck, a car, a boat, a plane, a motorcycle, and the like. A transport vehicle may be configured to operate through, but is not limited to, air, land, sea, and the like. A transport vehicle may be configured to engage in one or more steps of a transport. In some embodiments, a transport vehicle may engage in pickup, delivery, and/or line haul operations. In some embodiments, a transport vehicle may include, but is not limited to, Less than Truckload ("LTL") and/or Full Truckload ("FTL") freight delivery.

Still referring to FIG. 1, in some embodiments, first greenhouse gas data 108 may include data of a pollutant emission source that may not be directly related to a transportation entity. As a non-limiting example, first greenhouse gas data 108 may include data from energy used in electronic invoicing of a transport. A "transportation entity" as used in this disclosure is a being involved in a transportation of a component. In some embodiments, first greenhouse gas data 108 may include degrees of separation from a transportation entity. A "degree of separation" as used in this disclosure is a measure of relation between two or more one entities and/or objects. For instance and without limitation, a degree of separation of first greenhouse gas data 108 may include two degrees of separation from actions of a transportation entity, with a first degree being fuel consumption of a transport vehicle and a second degree being pollution generated from transport component packaging. Greenhouse gas emission sources that may be one degree of separation away from actions of a transportation entity may include, but are not limited to, greenhouse gas emissions produced in generating electricity used during operations related to a transport process. Operations related to a transport process may include, but are not limited to, computational power, conveyor use, manufacturing machine use, crane use, light sources, and the like.

Still referring to FIG. 1, first greenhouse gas data 108 may be represented in energy and/or fuel consumed by a transport vehicle, distance traveled of a transport vehicle, total fuel consumed of a transport, and the like. Fuel may include, but is not limited to, gasoline, diesel, propane, liquefied natural gas, and/or other fuel types. In some embodiments, a transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, bio-fuel, vegetable oil, propane, and the like. In the instance of alternative fuel, an energy conversion factor may be included. In some embodiments, an energy conversion factor may include, but is not limited to, gallons to electric equivalent for a hybrid or electric transport vehicle.

Still referring to FIG. 1, apparatus 104 may be configured to receive second greenhouse gas data 112. "Second greenhouse gas data" as used in this disclosure is a metric associated with a pollutant source. In some embodiments, second greenhouse gas data 112 may include data of an identical greenhouse gas emission source of first greenhouse gas data 108. In other embodiments, second greenhouse gas data 112 may include data from a different greenhouse gas emission source than first greenhouse gas data 108. In some embodiments, apparatus 104 may be configured to receive first greenhouse gas data 108 and/or second greenhouse gas data 112 from an external computing device, such as, but not limited to, a desktop, laptop, smartphone, server, and the like. In some embodiments, first greenhouse gas data 108 and/or second greenhouse gas data 112 may be generated from an on-board computing device of a transport vehicle.

Still referring to FIG. 1, apparatus 104 may be configured to calculate first greenhouse gas metric 116. A "greenhouse gas metric" as used in this disclosure is a metric pertaining to a pollutant emission contributing to the greenhouse effect. First greenhouse gas metric 116 may be calculated as a function of first greenhouse gas data 108. In some embodiments, first greenhouse gas metric 116 may include an amount of emission generated. An amount of emission generated may include, but is not limited to, volumes, weights, masses, ratios, and the like. In some embodiments, first greenhouse gas metric 116 may include a measurement pertaining to a specific user. In some embodiments, first greenhouse gas metric 116 may include data of an amount of emission generated by a specific user. In some embodiments, first greenhouse gas metric 116 may include data of a type of emission generated by a user. In some embodiments, first greenhouse gas metric 116 may include data of a ratio of emission generated by a user. A ratio may include, but is not limited to, user emissions to average emissions, pollution emissions to clean energy emissions, and the like.

Still referring to FIG. 1, apparatus 104 may be configured to calculate second greenhouse gas metric 120. "Second greenhouse gas metric" as used in this disclosure is any measurement pertaining to an auxiliary emission of pollutant of a user. In some embodiments, apparatus 104 may calculate second greenhouse gas metric 120 as a function of second greenhouse gas data 112. In some embodiments, second greenhouse gas metric 120 may be generated from a plurality of metrics. Second greenhouse gas metric 120 may include a measurement of an indirect source of pollutant emission, such as, but not limited to, distance traveled of a transport vehicle, transport type, invoicing, new hires, electricity used, and the like. In some embodiments, second greenhouse gas metric 120 may include, but is not limited to, a plurality of utility resources that are expended during a transport including water, electricity and other forms of energy consumed or expended by the transport vehicle. Second greenhouse gas metric 120 may include, but is not limited to, generation of electricity, a consumption of natural gas, propane, and oil. In some embodiments, second greenhouse gas metric 120 may include data of an aerial transport. An aerial transport may include, but is not limited to, an aircraft, helicopter, plane, drone, and the like. In some embodiments, data of an aerial transport may include distances traveled via aerial transport. In some embodiments, second greenhouse gas metric 120 may include manual data entered and/or recorded by a computing system of a transporter. In some embodiments, second greenhouse gas metric 120 may include emissions during a loading of components, such as a loading of components in a transport vehicle. In some embodiments, second greenhouse gas metric 120 may include emissions generated by equipment used in loading components to be transported. Equipment may include any machine configured to move one or more components. Equipment may include, but is not limited to, a forklift or other equipment used at a shipping terminal. In some embodiments, second greenhouse gas metric 120 may include utility expenditures associated with buildings and/or structures that may be associated with a transport vehicle and/or transport. In some embodiments, a first plurality of inputs may include an amount of fuel consumption and/or a number of miles driven by at least one vehicle associated with a freight carrier.

Still referring to FIG. 1, apparatus 104 may include greenhouse gas ratio calculator 124. Greenhouse gas ratio calculator 124 may include any computing system as described in this disclosure. Greenhouse gas ratio calculator 124 may be configured to apportion a greenhouse gas emission with a pollutant source. In some embodiments, greenhouse gas ratio calculator 124 may be configured to receive first greenhouse gas metric 116 and/or second greenhouse gas metric 120. Greenhouse gas ratio calculator 124 may be configured to determine an estimation of greenhouse gas emissions from first greenhouse gas metric 116 and/or second greenhouse gas metric 120. In some embodiments, greenhouse gas ratio calculator 124 may determine a conversion factor. A "conversion factor" as used in this disclosure is any ratio of energy used to greenhouse gas generated. In some embodiments, a conversion factor may include a carbon conversion rate for Liquefied Natural Gas ("LNG"), Kilowatts ("KW"), Diesel fuel, Compressed Natural Gas ("CNG"), Gasoline, biodiesel fuel, and/or air power. Determining greenhouse gas ratio 128 may include applying a conversion factor for fuel consumed by a transport vehicle and/or applying a conversion factor for a distance traveled by a transport. A "greenhouse gas ratio" as used in this disclosure is a proportion of a metric of a pollutant source to greenhouse gas emissions. In some embodiments, examples of a metric may include, but are not limited to, gallons of gasoline, diesel, or biodiesel fuel and number of miles driven by a vehicle. In some embodiments, a conversion factor for miles driven may be available from sources such as the Environmental Protection Agency ("EPA"). In some embodiments, a conversion factor may include grams of a GHG gas, such as carbon, emitted on a per mile basis. In some embodiments, a conversion factor may include a ratio of a pollutant emission to a greenhouse gas, such as, but not limited to, ozone, carbon, methane, propane, and the like. One of ordinary skill in the art would understand, after reviewing this disclosure in its entirety, how to determine a proper conversion factor to use for the calculation.

Still referring to FIG. 1, first greenhouse gas metric 116 and/or second greenhouse gas metric 120 may be calculated by apparatus 104 with a conversion factor for a specific natural resource consumed during generation or use of a utility service. In some embodiments, a utility service may include, but is not limited to, natural gas, electricity, water, and/or oil. As a non-limiting example, a utility service may include water heating, sewage systems, lighting systems, heating and cooling systems, and the like. In some embodiments, a conversion factor may be associated with a generation of electricity. Carbon emissions may vary with an amount and type of energy source used in producing electricity. In some embodiments, a conversion factor may be calculated based on a plurality of factors such as, but not limited to, location, time of year, type of resource consumed during a generation of electricity, and the like. In some embodiments, a grid mix for a particular location may determine a conversion factor or factors that may be used. A type of resource consumed may include, but is not limited to, coal, natural gas, and/or other material that may be burned or used up during a generation of electricity. Additionally, renewable resources may be used during the generation of electricity and may allow for an offset of some carbon emissions that may be caused by a use of other resources.

Still referring to FIG. 1, in some embodiments, a transport may include a plurality of components. In some embodiments, a plurality of components may include, but is not limited to, consumer goods. In some embodiments, each component of a plurality of components may be associated with one or more users. A user may include a transport recipient. Apparatus 104 may be configured to allocate an amount of greenhouse gas produced during a transport to a user based on a plurality of factors. In some embodiments, an amount of greenhouse gas produced may be allocated to a user based on factors such as, but not limited to, weight, volume, and/or fuel consumed during a transport of the plurality of components. This allocation process may be repeated based on multiple transports to provide a user with a total amount of carbon emissions associated with a user for a predetermined time period, such as, but not limited to, a year, month, week, and the like. In some embodiments, a portion of a total carbon amount may be allocated to a plurality of users. For instance and without limitation, a transport may include four transport recipients at four varying destinations. Apparatus 104 may determine that a transport has a total greenhouse gas emission of 24 metric tons of carbon. Apparatus 104 may be configured to determine a contribution of greenhouse gas emissions by each of the four transport recipients. Apparatus 104 may determine a first transport recipient contributed 4 metric tons of carbon emissions, a second transport recipient contributed 12 metric tons of carbon emissions, a third transport recipient contributed 6 metric tons of carbon emissions, and a fourth transport recipient contributed 2 metric tons of carbon emissions to a total carbon emission of a transport. Each determination of a contributed greenhouse gas emission of each transport recipient may be calculated by apparatus 104 through factors such as, but not limited to, transport component weight, transport component quantity, transport distance, transport routes, transport component packaging, electronic invoicing, and the like.

Still referring to FIG. 1, in some embodiments, a first greenhouse gas data 108 and/or a second greenhouse gas data 112 may be stored in a database. A database may include, but is not limited to, Enterprise Resource Planning ("ERP") databases, invoices records and/or other data sources. In some embodiments, a database may store and retrieve information automatically. In other embodiments, a database may be configured to receive manual inputs from a user. In other embodiments, information may be imported to a database. In some embodiments, a distance traveled, and/or energy consumed may be stored as transport vehicle miles and gallons of fuel consumed in separate databases for different transport vehicle categories. In some embodiments, a database may store information for a car category and a truck category separately. In other embodiments, a database may store carbon emission data of a car category and a truck category together. A database may include data from an ERP database. In some embodiments, a database may include airline transportation invoices. In some embodiments, a database may include utility data, transport invoices, and/or other data.

Still referring to FIG. 1, apparatus 104 may include an objective function. An "objective function" as used in this disclosure is a process of minimizing or maximizing one or more values based on a set of constraints. Apparatus 104 may generate an objective function to optimize a greenhouse gas emission of a transport. In some embodiments, an objective function of apparatus 104 may include an optimization criterion. An optimization criterion may include any description of a desired value or range of values for one or more attributes of a transport; desired value or range of values may include a maximal or minimal value, a range between maximal or minimal values, or an instruction to maximize or minimize an attribute and/or a threshold value. As a non-limiting example, an optimization criterion may specify that a greenhouse gas emission of a transport should be less than 3 metric tons; an optimization criterion may cap a greenhouse gas emission of a transport, for instance specifying that a transport must not have a greenhouse gas emission greater than a specified value. An optimization criterion may specify one or more desired transport criteria. In an embodiment, an optimization criterion may assign weights to different attributes or values associated with attributes; weights, as used herein, may be multipliers or other scalar numbers reflecting a relative importance of a particular attribute or value. One or more weights may be expressions of value to a user of a particular outcome, attribute value, or other facet of a transport; value may be expressed, as a non-limiting example, in remunerative form, such as a material quality, a quickest transport, or the like. As a non-limiting example, minimization of greenhouse gas emissions may be multiplied by a first weight, while tolerance above a certain value may be multiplied by a second weight. Optimization criteria may be combined in weighted or unweighted combinations into a function reflecting an overall outcome desired by a user; a function may be a greenhouse gas emission function to be minimized and/or maximized. A function may be defined by reference to transport criteria constraints and/or weighted aggregation thereof as provided by apparatus 104; for instance, a greenhouse gas emissions function combining optimization criteria may seek to minimize or maximize a function of greenhouse gas emissions.

Still referring to FIG. 1, apparatus 104 may use an objective function to compare first greenhouse gas metric 116 and/or second greenhouse gas metric 120 with an ideal greenhouse gas metric. An "ideal greenhouse gas metric" as used in this disclosure is an optimal value of pollutant emissions. An ideal greenhouse gas metric may include, but is not limited to, a range of a quantity of pollutant emissions. For instance and without limitation, an ideal greenhouse gas metric may include a range of about between 1 to 5 metric tons of carbon. Generation of an objective function may include generation of a function to score and weight factors to achieve a process score for each feasible pairing. In some embodiments, pairings may be scored in a matrix for optimization, where columns represent transports and rows represent greenhouse gas emissions potentially paired therewith; each cell of such a matrix may represent a score of a pairing of the corresponding transport to the corresponding greenhouse gas emission. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 104 may select pairings so that scores associated therewith are the best score for each order and/or for each process. In such an example, optimization may determine the combination of processes such that each object pairing includes the highest score possible.

Still referring to FIG. 1, an objective function may be formulated as a linear objective function. Apparatus 104 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transports r, S is a set of all greenhouse gas emissions s, $c_{rs}$ is a score of a pairing of a given transport with a given greenhouse gas emission, and $x_{rs}$ is 1 if a transport r is paired with a greenhouse gas emission s, and 0 otherwise. Continuing the example, constraints may specify that each transport is assigned to only one greenhouse gas emission, and each greenhouse gas emission is assigned only one transport. Matches may include matching processes as described above. Sets of processes may be optimized for a maximum score combination of all generated processes. In various embodiments, apparatus 104 may determine a combination of transports that maximizes a total score subject to a constraint that all transports are paired to exactly one greenhouse gas emission. Not all transports may receive a greenhouse gas emission pairing since each greenhouse gas emission may only pair to one transport. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 104 and/or another device in system 100, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 104 may assign variables relating to a set of parameters, which may correspond to score components as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of transport times. Objectives may include minimization of greenhouse gas emissions. Objectives may include minimization of long idle times. Objectives may include minimization of cost. Objectives may include minimization of resources used.

Still referring to FIG. 1, apparatus 104 may determine one or more factors contributing to first greenhouse gas metric 116 and/or second greenhouse gas metric 120. As a non-limiting example, apparatus 104 may determine a transport to a user includes a long travel time as first greenhouse gas metric 116 and a large amount of fuel consumed as a second greenhouse gas metric 120. Apparatus 104 may also determine a plurality of other contributing factors, such as, but not limited to, long idle percentages, amounts of stops in a transport, transport weight, transport path efficiency, and the like. Apparatus 104 may compare two or more contributing factors using an objective function to minimize an amount of greenhouse gas produced. As a non-limiting example, apparatus 104 may compare a transport distance to a number of stops in a transport path. Apparatus 104 may determine that a total amount of greenhouse gas produced by a transport may be offset by reducing a number of stops in the transport. Apparatus 104 may utilize a machine learning model to predict greenhouse gas generation of a transport. A machine learning model may be trained on training data correlating transport factors to greenhouse gas generation. A machine learning model may be configured to input transport factors and output estimated greenhouse gas emissions. In some embodiments, apparatus 104 may be configured to estimate greenhouse gas emissions of particular users, transports, individual contributing factors, and the like.

Still referring to FIG. 1, apparatus 104 may be configured to display, but is not limited to displaying, greenhouse gas data, greenhouse gas metrics, greenhouse gas ratios, and the like to a user. In some embodiments, apparatus 104 may display greenhouse gas data and/or metrics through a graphical user interface (GUI). In some embodiments, apparatus 104 may be configured to display greenhouse gas data to a user through, but not limited to, a smartphone, tablet, desktop, laptop, and the like. Apparatus 104 may display alternative options for a transport of a user. Displaying greenhouse gas data and/or greenhouse gas metrics may be as described below with reference to FIG. 3.

Still referring to FIG. 1, in some embodiments, apparatus 104 may generate a pollutant profile of a user and/or transportation entity. A "pollutant profile" as used in this disclosure is a collection of pollutant data relating to an entity. "Pollutant data" as used in this disclosure is information relating to environmentally harmful emissions. Pollutant data may include, but is not limited to, types of pollutants, quantity of pollutant, frequency of pollutant emissions, and the like. Pollutant data may include first greenhouse gas data 108 and/or second greenhouse gas data 112. Apparatus 104 may generate a pollutant profile as a function of first greenhouse gas metric 116 and/or second greenhouse gas metric 120. In other embodiments, apparatus 104 may generate a pollutant profile as a function of greenhouse gas ratio 128. A pollutant profile may be continually updated through apparatus 104 as a function of greenhouse gas metric calculations. In some embodiments, apparatus 104 may receive greenhouse gas data from, but not limited to, an external computing device, user input, and the like.

Still referring to FIG. 1, a pollutant profile may include, but is not limited to, a profile of a consumer, transportation entity, transport facility, and the like. A pollutant profile may include profile data such as, but not limited to, pollutant emission averages, pollutant emission maximums, pollutant emission minimums, pollutant emission trends, pollutant emission percentiles, and the like. For instance and without limitation, a pollutant profile may include a collection of pollutant data of a user showing the user has a maximum pollutant emission per transport of 4 metric tons of carbon. Continuing this example, a pollutant profile of a user may show that the user generates an average of 12% more pollutant than similar users. A pollutant profile may include pollutant profile categories. A "pollutant profile category" as used in this disclosure is a classification of profile data to a group. A pollutant profile category may include a type of pollutant emission. A type of pollutant emission may include, but is not limited to, transport vehicle fuel, quantity of transport component packages received, electricity used, and the like. For instance and without limitation, a pollutant profile may include a breakdown chart of types of pollutant emissions of a user showing 70% pollutant is from transport vehicle fuel, 15% is from electricity used during a transport to the user, and 15% is from a high quantity of packages of transport components delivered to the user. In some embodiments, a pollutant profile category may include a most contributing pollutant factor. A "most contributing pollutant factor" as used in this disclosure is a transport parameter having a highest impact on pollutant emissions. A most contributing pollutant factor may include, but is not limited to, frequency of transports, quantity of transports, type of transport component, quantity of transport component packages, and the like. For instance and without limitation, a pollutant profile of a user may show that the user requests a high frequency of transports which may contribute the most to the users pollution emissions. In some embodiments, a pollutant profile category may include transport component types of a user. A transport component type may include, but is not limited to, consumer goods, electronics, construction materials, vehicle parts, houseware, and the like. For instance and without limitation, a pollutant profile of a user may include a pollutant profile category showing the user may request transports of bottled water, which may contribute to pollutant emissions by way of producing the plastic of the bottles of the bottled water.

Still referring to FIG. 1, in some embodiments, apparatus 104 may generate a pollutant profile of a transportation entity. For instance and without limitation, a pollutant profile of a transportation entity may show that the transportation entity tends to make frequent rest stops while remaining idle, which may increase pollutant emissions. As another non-limiting example, a pollutant profile of a transportation entity may show the transportation entity tends to take longer paths to a destination, which may contribute to pollutant emissions. A pollutant profile of a transportation entity may include pollutant profile categories and as described above. For example and without limitation, a pollutant profile of a transportation entity may show a transportation entity operates a fuel inefficient transport vehicle, such as a semi-truck or tractor trailer. As another non-limiting example, a pollutant profile of a transportation entity may show the transportation entity tends to operate a transport vehicle inefficiently, such as by speeding, braking frequently, taking longer routes to a destination, and the like.

Still referring to FIG. 1, in some embodiments, a pollutant profile may be generated for a transportation facility. A transportation facility may include, but is not limited to, warehouses, manufacturing plants, vendors, and the like. A pollutant profile of a transportation facility may include pollutant profile data as described above. In some embodiments, a pollutant profile of a transportation facility may include a pollutant emission breakdown of pollutant contributing factors. For instance and without limitation, a pollutant profile of a transportation facility may show the transportation facility consumes a high amount of electricity, heating appliances, plumbing systems, and the like. Pollutant profile data of a transportation facility may include real estate data. "Real estate data" as used in this disclosure is information pertaining to buildings. Real estate data may include, but is not limited to, building size, building square footage, quantity of office spaces, building location, and the like. A pollutant profile of a transportation facility may include real estate efficiency. For instance and without limitation, a pollutant profile of a transportation facility may show that a transportation facility operates out of a 30 office building while only having 15 employees, which may contribute to real estate inefficiency. A pollutant profile of a transportation facility may include location inefficiency data. For instance and without limitation, a pollutant profile of a transportation facility may show that a transportation facility is located far away from cities, suburbs, and the like, which may contribute to pollutant emissions by way of extra travelling distances.

Still referring to FIG. 1, in some embodiments, a pollutant profile may include a scoring system. A "scoring system" as used in this disclosure is a process that determines a value of an input according to a criteria. A scoring system may include, but is not limited to, a range of 1 to 5 stars, a score out of 10, a score out of 100, a percentage, and the like. In some embodiments, a higher score may indicate a low pollutant emissions output. In other embodiments, a higher score may indicate a high pollutant emissions output. A score of a pollutant profile may be calculated from one or more pollutant criterion. A "pollutant criterion" as used in this disclosure is a metric constraining a pollutant profile value. A pollutant criterion may include, but is not limited to, quantity of pollutant emissions, frequency of pollutant emissions, pollutant emission types, and the like. For instance and without limitation, a user may have a pollutant profile showing a score of 3 out of 5 stars, which may be attributed to lower than average pollutant emissions frequency, but higher overall pollutant emissions compared to similar users.

Still referring to FIG. 1, in some embodiments, apparatus 104 may track a transport for greenhouse gas data to determine an overall pollutant score. Starting a transport may include receiving one or more electronic orders. Receiving electronic orders may use electricity and/or computational power which may contribute to greenhouse gas emissions. Apparatus 104 may measure an amount of electricity consumed through electronic invoicing and/or order requests of a transport and may calculate greenhouse gas ratio 128 at an initial stage of a transport to determine greenhouse gas emissions. In some embodiments, a stage of a transport may include packaging and/or wrapping one or more transport components identified from an electronic order. Producing and/or receiving packaging materials such as, but not limited to, cardboard boxes, plastic containers, tape, Styrofoam, and the like may contribute to greenhouse gas emissions. Apparatus 104 may calculate greenhouse gas ratio 128 to determine an amount of greenhouse gas emissions produced through the packaging of transport components. In some embodiments, a transport may include a loading phase, which may include loading transport components into a transport vehicle. A loading phase may produce greenhouse gas emissions through light sources of a transport facility and/or transport vehicle, operation of conveyors or other machinery to load a transport vehicle, and the like. Apparatus 104 may calculate greenhouse gas ratio 128 to determine an amount of greenhouse gas emissions produced during a loading phase of a transport. In some embodiments, a transport may include translocating one or more transport components via a transport vehicle. Greenhouse gas emissions may be produced during a translocation of transport components of a transport, such as by a transport vehicle. A transport vehicle may navigate efficiently to a destination by taking a less linear path, which may produce greenhouse gas emissions. In some embodiments, a transport vehicle may remain idle for an extended period of time, which may produce greenhouse gas emissions. A transport vehicle may make frequent stops, which may produce greenhouse gas emissions. Apparatus 104 may calculate greenhouse gas ratio 128 to determine greenhouse gas emissions of a translocation of transport components of a transport. Apparatus 104 may determine an individual score for each step of a transport. In some embodiments, apparatus 104 may determine an overall score for a transport, such as, but not limited to, a score out of 5, a score out of 10, a score out of 100, a range between 0 to 5 stars, and the like.

Still referring to FIG. 1, in some embodiments, apparatus 104 may be configured to provide greenhouse gas emission feedback 132 through a display as a function of a calculation of greenhouse gas ratio 128. "Greenhouse gas emission feedback" as used in this disclosure is information pertaining to greenhouse gas emissions of an individual, object, and/or entity. Greenhouse gas emission feedback 132 may include, without limitation, historical trends, daily emissions, hourly emissions, and the like. In some embodiments, greenhouse gas emission feedback 132 may include a comparison of a user to one or more other users. For instance and without limitation, a user may drive inefficiently, causing an extra 0.4 metric tons of greenhouse gas emissions. A second user may drive efficiently, causing no extra greenhouse gas emissions. Greenhouse gas emission feedback 132 may show a first user a comparison of a second user driving efficiently and/or may show steps to increase driving efficiency of the first user. Greenhouse gas emission feedback 132 may include a greenhouse gas reduction plan. Apparatus 104 may generate a greenhouse gas reduction plans as a function of a tracking of a transport. A "greenhouse gas reduction plan" as used in this disclosure is a step or steps of preventing excessive pollutant emissions. A greenhouse gas reduction plan may be generated for a transport recipient, which may include, but is not limited to, recommended fuel types, transport times, fewer transport component packages, less frequent transports, and the like. For instance and without limitation, apparatus 104 may present a greenhouse gas reduction plan to a user through an external computing device, such as a smartphone, laptop, desktop, and the like. A greenhouse gas reduction plan generated for a transport recipient may include environmentally friendly options such as using alternate fuels, using recyclable materials, using biodegradable packaging, and the like. Apparatus 104 may display an estimated amount of greenhouse gas emissions reduced through selecting environmentally friendly options of a greenhouse gas reduction plan. In some embodiments, apparatus 104 may be configured to generate costs associated with choosing environmentally friendly options, such as, but not limited to, costs of fuel, costs of transport component packaging, costs of transport duration, and the like. A greenhouse gas reduction plan and options for a user associated therewith may be described in more detail below with regard to FIG. 3.

Figure 2:
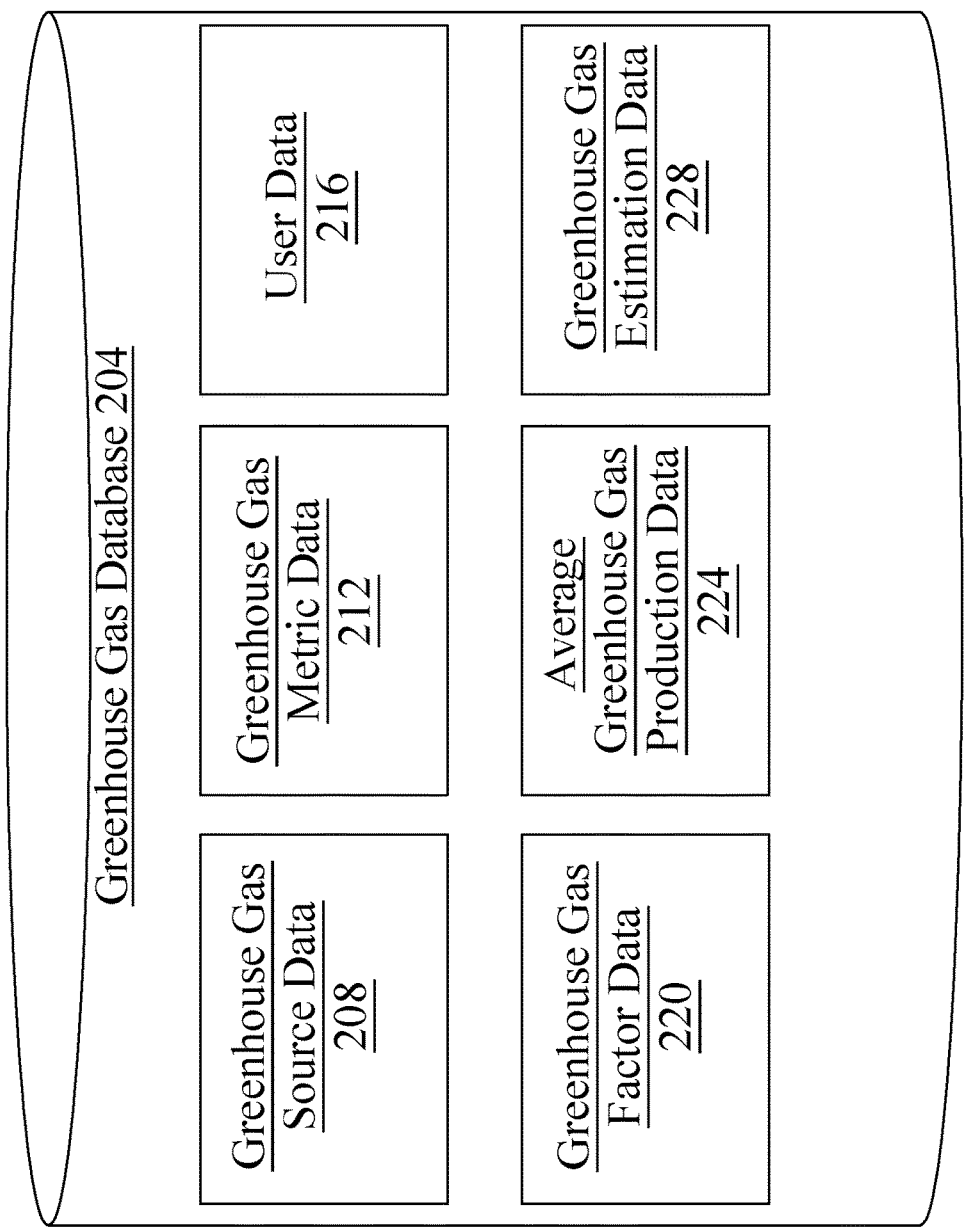
FIG. 2 is an exemplary embodiment of a greenhouse gas database.

Referring now to FIG. 2, greenhouse gas database 204 is presented. Greenhouse gas database 204 may be implemented, without limitation, as a relational database, a key-value retrieval database such as a NOSQL database, or any other format or structure for use as a database that a person skilled in the art would recognize as suitable upon review of the entirety of this disclosure. Greenhouse gas database 204 may alternatively or additionally be implemented using a distributed data storage protocol and/or data structure, such as a distributed hash table or the like. Greenhouse gas database 204 may include a plurality of data entries and/or records as described above. Data entries in a greenhouse gas database 204 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, greenhouse gas database 204 may include greenhouse gas source data 208. Greenhouse gas source data 208 may include data of a plurality of greenhouse gas sources. Greenhouse gas source data 208 may include emissions types. Emission types may include categories of sources of greenhouse gas emissions. Categories may include transport vehicle emissions. Transport vehicle emissions may include emissions from transport vehicles, such as, but not limited to, cars, trucks, planes, ships, motorcycles, drones, and the like. Categories may include types of emissions. Types of emissions may include, but are not limited to, carbon emissions, methane emissions, water vapor emissions, ozone emissions, and the like. Greenhouse gas source data 204 may link a type of emission to an emission category. As a non-limiting example, greenhouse gas source data 204 may link a carbon dioxide emission source to a truck category.

Still referring to FIG. 2, greenhouse gas database 204 may include greenhouse gas metric data 212 Greenhouse gas metric data 212 may include any data associated with greenhouse gas emissions. In some embodiments, greenhouse gas metric data 212 may include amounts of greenhouse generated. Amounts may include, but are not limited to, tons, pounds, kilograms, cubic meters, and the like. In some embodiments, greenhouse gas metric data 212 may include emission frequencies. Emission frequencies may include how often a greenhouse gas source emits greenhouse gas. Emission frequencies may include periods of time such as, but not limited to, minutes, hours, days, weeks, months, years, and the like. As a non-limiting example, greenhouse gas metric data 212 may include data showing a truck emits carbon dioxide every minute. Greenhouse gas metric data 212 may include a plurality of metrics. A plurality of metrics may include, but are not limited to, transport vehicle miles per gallon (mpg), transport vehicle driver turnover, new hires, kilowatt hours (KwH) per day, carbon dioxide (CO2) metric tons per day, CO2 metric tons per transport, long idle percent, monthly propane, electronic invoicing, and the like. Transport vehicle driver turnover may include a change in transport vehicle drivers over a period of time. New hires may include an amount of new individuals hired at a transportation entity. Long idle percent may include a percentage of time a transport vehicle idles over a certain idling threshold. An idling threshold may include a set of time where a transport vehicle is turned on but is otherwise inactive, that, if reached, counts as long idling. In some embodiments, an idling threshold may include 5 minutes. Monthly propane may include an amount of propane used over a span of a month. Electronic invoicing may include a transmission of data between a transportation entity and a transport recipient. In some embodiments, a table may include carbon amount totals of a tractor portion, a straight truck portion, a company vehicle portion, and a utility track portion, and the like. Additionally, a total for miles driven and/or gallons of fuel consumed may include totals of a company vehicle and/or tractor portions. In some embodiments, a table may include calculations may report a summary of an amount of carbon produced or emitted as part of operations of a transport vehicle during a predetermined period of time. In some embodiments, a table may include data such as, but not limited to, Average Carbon per Day, Average Carbon per Shipment, Year over Year Carbon Savings, Average KW per Day, and/or Average Mile Per Gallon ("MPG"). In some embodiments, a table may include an average MPG of a transport vehicle which may be represented on a monthly basis, yearly basis, weekly basis, daily basis, and the like. In some embodiments, greenhouse gas metric data 208 may include a past history of MPG values. Greenhouse gas metric data 208 may include a bar graph of year to date ("YTD") carbon savings from improved MPG represented in tons saved on a monthly basis. In some embodiments, greenhouse gas metric data 208 may include a Year over Year Carbon Savings report, which may be calculated as carbon determined based on KW from a previous year, compared to carbon determined based on KW from a current year. Additionally or alternatively, a Year over Year Carbon Savings may be calculated as an inverse of MPG from a previous subtracted by MPG of the current year multiplied by miles traveled a current year, which may be multiplied by an appropriate carbon conversion rate. In some embodiments, greenhouse gas metric data 212 may include a summary of average KW expenditures per day on monthly basis, weekly basis, yearly basis, and the like. In some embodiments, greenhouse gas metric data 208 may include a measure of an average amount of carbon produced during a transport of components on a monthly basis, yearly basis, weekly basis, daily basis, and the like. In some embodiments, greenhouse gas metric data 212 may include a bar graph that may compare carbon in terms of average metric tons emitted per day on a daily, weekly, monthly, and/or yearly basis. In some embodiments, greenhouse gas metric data 212 may be used by apparatus 104 to predict future greenhouse gas metric calculations. In some embodiments, future greenhouse gas metric calculations may be determined for a specific transport recipient, greenhouse gas emission source, and the like. In some embodiments, greenhouse gas metric data 212 may be used by apparatus 104 to calculate specific parameters that contribute to greenhouse gas emissions amounts, such as, but not limited to, weight, volume, distance, and transport vehicle type, transport method, and the like. A transportation entity and/or others may use greenhouse gas metric data 212 to better understand and plan for reductions in greenhouse gas emissions produced during a transportation process.

Still referring to FIG. 2, greenhouse gas database 204 may include user data 216. User data 216 may include information of one or more users. Information may include, but is not limited to, addresses, online profiles, names, and the like. User data 216 may include greenhouse gas emissions pertaining to one or more users. User data 212 may include average greenhouse gas generation for a transport of a given user. As a non-limiting example, user data 216 may include data showing on average, a specific user generates 8 metric tons of carbon per transport. User data 216 may include comparisons of one user profile to another user profile. As a non-limiting example, user data 216 may include data showing on average, a specific user generates 2 metric tons of carbon less than similar user profiles. In some embodiments user data 216 may include user history data. User history data may include previous greenhouse gas emissions of one or more users. In some embodiments, user data 216 may include historical trends of greenhouse gas emissions of a user. As a non-limiting example, user data 216 may show a historical trend of decreasing average greenhouse gas emissions each year by 0.5 metric tons of carbon for a specific user.

Still referring to FIG. 2, greenhouse gas database 204 may include greenhouse gas factor data 220. Greenhouse gas factor data 220 may include data of one or more greenhouse gas generation contributors. Contributors may include, but are not limited to, resources used, fuel used, electricity used, transport times, transport vehicles used, number of transports, transport distance, long idle times, and the like. Greenhouse gas factor data 220 may include data of a weighted amount of a contributor of greenhouse gas generation. As a non-limiting example, greenhouse gas factor data 220 may include data showing electricity generated during a transport has a weight of 0.2 compared to gasoline used by a truck, which may have a weight of 0.8. In some embodiments, greenhouse gas factor data 220 may include categories of factors. Categories of factors may include, but are not limited to, primary greenhouse gas emission factor, secondary greenhouse gas emission factor, tertiary greenhouse gas emission factor, and the like. A primary greenhouse gas emission factor may include a direct greenhouse gas emission contributor, such as, but not limited to, carbon dioxide emissions from a truck. A secondary greenhouse gas emission factor may include, but is not limited to, number of stops in a transport path, long idle percent, and the like. A tertiary greenhouse gas emission factor may include, but is not limited to, new hires, driver turnovers, electronic invoicing, and the like.

Still referring to FIG. 2, greenhouse gas database 204 may include average greenhouse gas production data 224. Average greenhouse gas production data 224 may include average amounts of greenhouse gas produced from one or more emission sources. In some embodiments, average greenhouse gas production data 224 may include average emissions of one or more users. In some embodiments, average greenhouse gas production data 224 may include average greenhouse gas production of a facility, such as a transport facility. Average greenhouse gas production data 224 may include subcategories, such as, but not limited to, average greenhouse gas production of transport vehicles, users, transport paths, and the like.

Still referring to FIG. 2, greenhouse gas database 204 may include greenhouse gas estimation data 228. Greenhouse gas estimation data 228 may include estimations of greenhouse gas emissions from one or more emission sources. Estimations of greenhouse gas emissions may include estimations of a specific transport. As a non-limiting example, greenhouse gas estimation data 228 may include estimations of a transport of an office desk to a user addresses. In some embodiments, greenhouse gas estimation data 224 may be updated based on iterations of predictions from a machine learning model.

Figure 3:
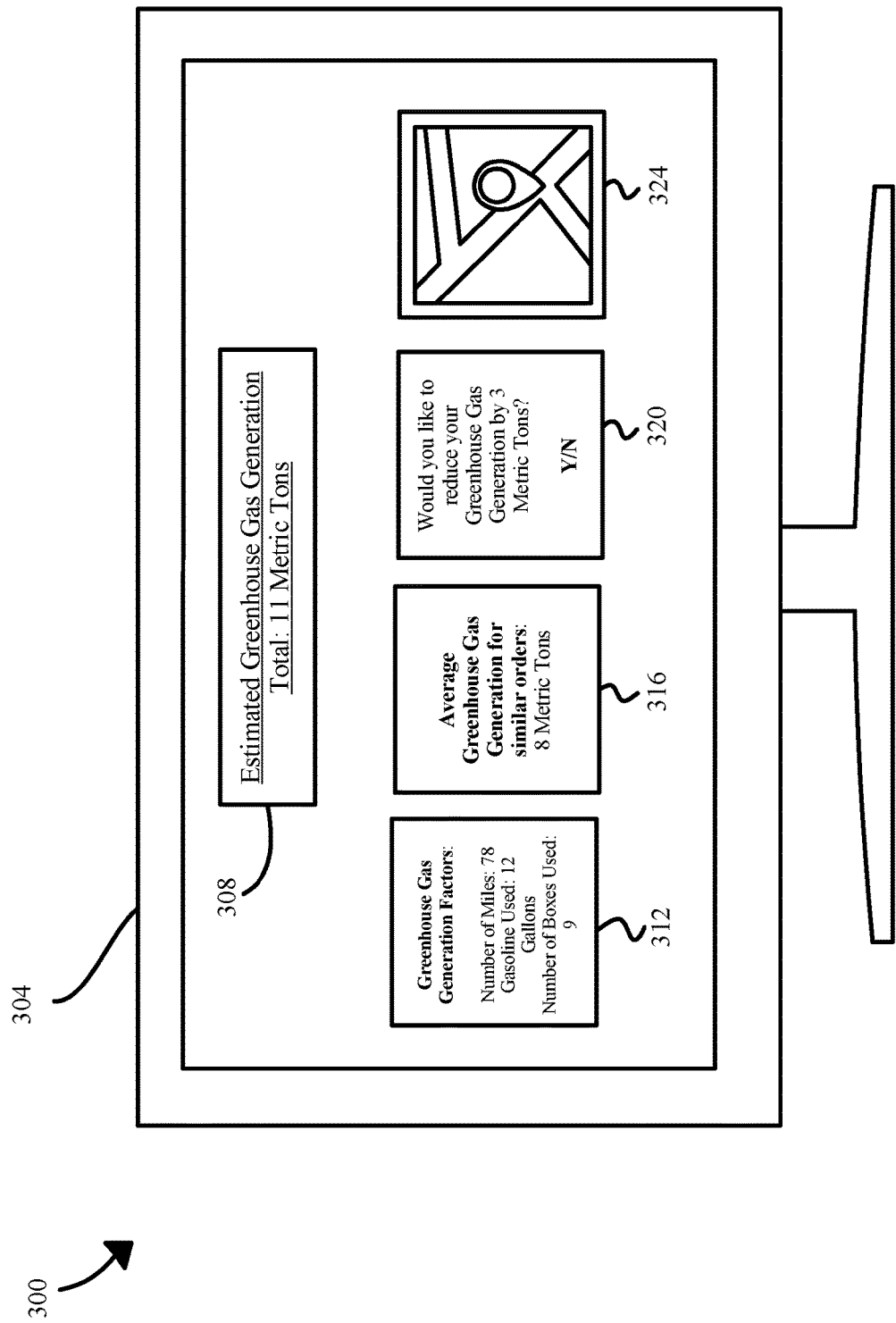
FIG. 3 is an illustration of an embodiment of greenhouse gas sources associated with a user.

Now referring to FIG. 3, system 300 for displaying greenhouse gas data is presented. System 300 may include display 304. Display 304 may include, but is not limited to, a LCD screen, OLED screen, and the like. Display 304 may include, but is not limited to, a smartphone, tablet, desktop, laptop, monitor, and the like. In some embodiments, display 304 may be configured to display greenhouse gas estimation data 308. Greenhouse gas estimation 308 may include estimation of greenhouse gas generation of a specific transport of a specific user. In some embodiments, display 304 may be configured to display greenhouse gas generation factors 312. Greenhouse gas generation factors 312 may include a breakdown of contributing factors of greenhouse gas estimation 308. Greenhouse gas generation factors 312 may include, but is not limited to, distances, fuel used, transport component quantity, and the like. In some embodiments, display 304 may be configured to display average greenhouse gas generation 316. Average greenhouse gas generation 316 may include greenhouse gas emission data of similar transports. In some embodiments, display 304 may display data of one or more routes as a function of one or more prediction algorithms. Prediction algorithms may include any machine learning model as described throughout this disclosure. For instance, and without limitation, display 304 may be configured to display map 324. Map 324 may include, without limitation, a local map, city map, and the like. Map 324 may include, without limitation, streets, addresses, traffic data, environmental data, tolls, times, and the like. In some embodiments, map 324 may include one or more transport routes. Map 324 may display a "best route", which as used in this disclosure is an optimal route according to one or more transport criteria, such as without limitation minimization of any loss function as described in further detail below. As a non-limiting example, a best route may include a transportation path that has a minimal greenhouse gas emission metric. Display 304 may show one or more transportation criterion along a best route through map 324. A best route may be determined using any optimization and/or machine learning algorithm as used throughout this disclosure. In some embodiments, map 324 may display two or more transport routes. For instance and without limitation, map 324 may include a first transport route which may be associated with a first predicted greenhouse gas estimation. Map 324 may display a second transport route associated with a second predicted greenhouse gas estimation. Display 304 may be configured to display greenhouse gas reduction option 320. Greenhouse gas reduction option 320 may include one or more alternatives for a transport. In some embodiments, one or more alternatives for a transport may include adjusting transport parameters of a transport, such as, but not limited to, transport times, transport distances, quantity of transport components, type of fuel used, and the like. As a non-limiting example, greenhouse gas reduction option 320 may display to a user an alternative transport path that may include transport path along a route of other users which may increase transport times but reduce greenhouse gas generation. As another non-limiting example, greenhouse gas reduction option 320 may display to a user an alternative fuel choice for a transport, such as electricity, which may reduce greenhouse gas generation but increase transport times. In some embodiments, greenhouse gas reduction option 320 may be configured to display an amount of greenhouse gas reduction associated with alternative transport parameters. As a non-limiting example, greenhouse gas reduction option 320 may display to a user that the user may reduce greenhouse gas emissions by 3 metric tons if they choose an alternative transport. Greenhouse gas reduction option 320 may be configured to receive user input. User input may include selecting one or more transport parameters affecting greenhouse gas generation. System 300 may be configured to communicate user input to apparatus 104. Apparatus 104 may be configured to adjust a transport as a function of user input received.

Figure 4:
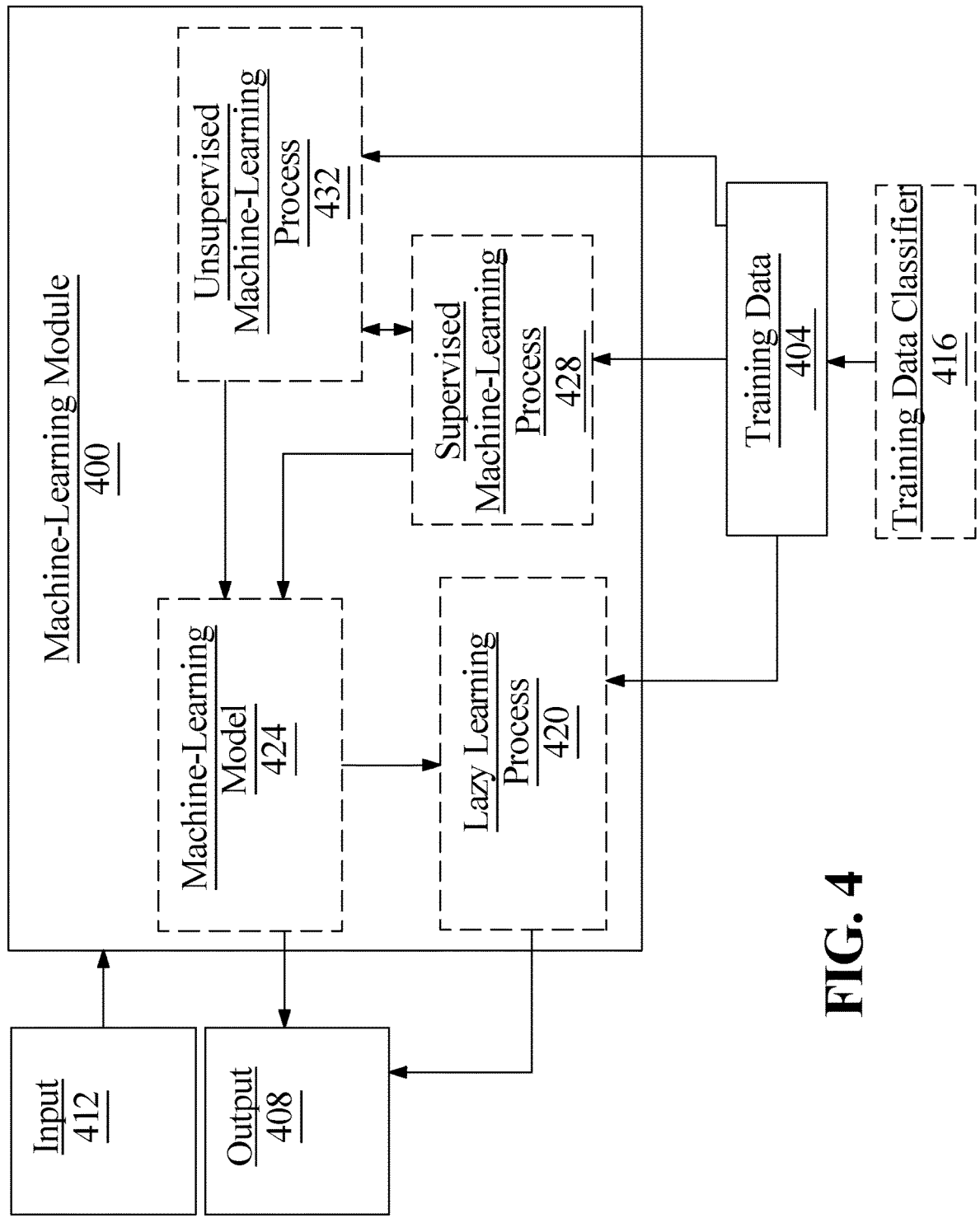
FIG. 4 is a diagram of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. Training data 404 may be received from an external computing device, user input, and/or previous iterations of processing. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include transport parameters and outputs may include greenhouse gas generation estimations.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to greenhouse gas emission types, categories, and the like.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include transport parameters as described above as inputs, greenhouse gas estimations as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
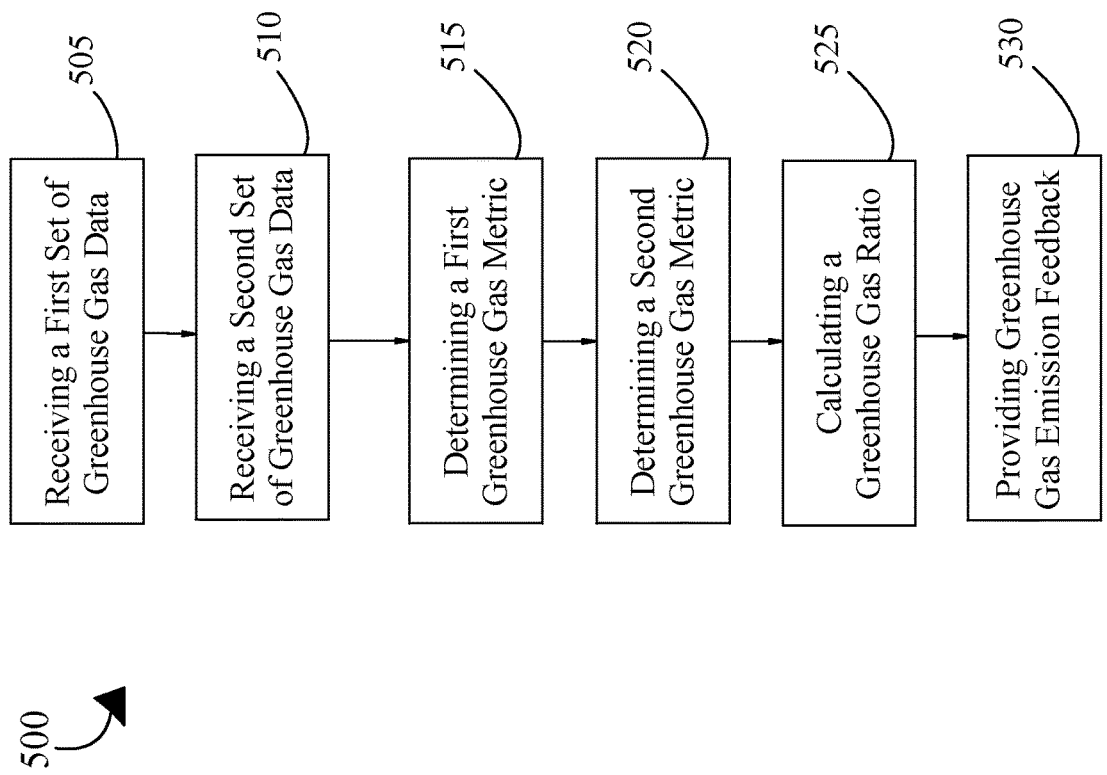
FIG. 5 is a flowchart of a method of greenhouse gas tracking.

Referring now to FIG. 5, an exemplary method 500 of greenhouse gas tracking using a computing device is disclosed. At step 505, method 500 includes receiving a first set of greenhouse gas data. Receiving a first set of greenhouse gas data may include, but is not limited to, receiving data from an external computing device, manual user input, and the like. This step may be implemented as described above in FIGS. 1-4.

Still referring to FIG. 5, at step 510 method 500 includes receiving a second set of greenhouse gas data. Receiving a second set of greenhouse gas data may include, but is not limited to, receiving data from an external computing device, manual user input, and the like. This step may be implemented as described above in FIGS. 1-4.

Still referring to FIG. 5, at step 515, method 500 includes determining a first greenhouse gas metric. A first greenhouse gas metric may be determined as a function of a first set of greenhouse gas data. In some embodiments, determining a first greenhouse gas metric may include calculating an amount of greenhouse gas emissions produced from a user. This step may be implement as described above in FIGS. 1-4.

Still referring to FIG. 5, at step 520, method 500 includes determining a second greenhouse gas metric. A second greenhouse gas metric may be determined as a function of a second set of greenhouse gas data. In some embodiments, determining a second greenhouse gas metric may include calculating an amount of greenhouse gas emissions produced from a user. This step may be implement as described above in FIGS. 1-4.

Still referring to FIG. 5, at step 525, method 500 includes calculating a greenhouse gas ratio. A greenhouse gas ratio may be calculated as a function of a first greenhouse gas metric and a second greenhouse gas metric. In some embodiments, calculating a greenhouse gas ratio may include calculating a greenhouse gas ratio associated with a user of a plurality of users. This step may be implemented as described above in FIGS. 1-4.

Still referring to FIG. 5, at step 530, method 500 includes providing greenhouse gas emission feedback. Greenhouse gas emission feedback may be provided through a display, such as without imitation a graphical user interface (GUI). In some embodiments, a display may include but is not limited to, smartphones, laptops, desktops, monitors, tablets, and the like. This step may be implemented as described above in FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
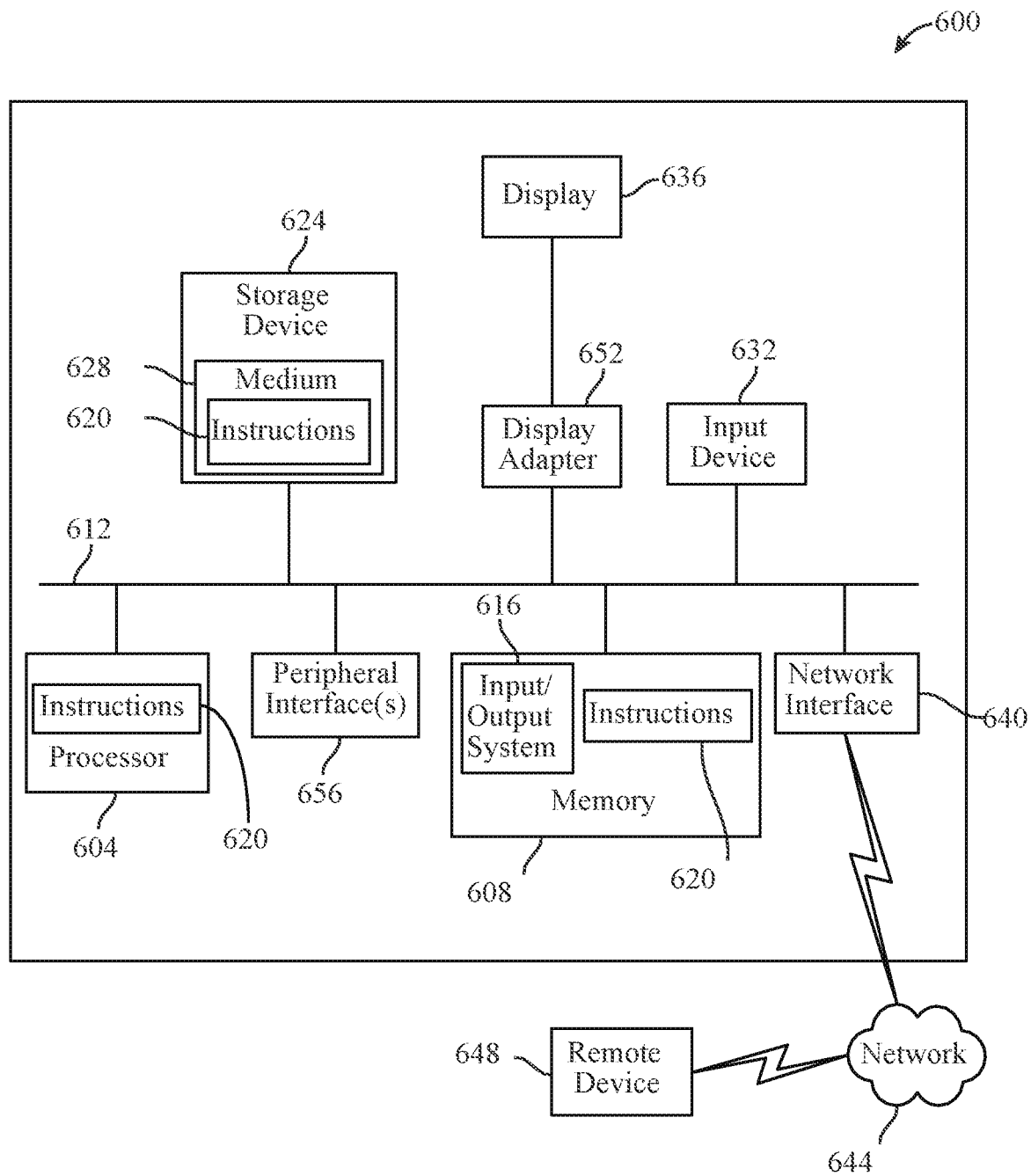
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Still referring to FIG. 6, processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 6, memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Still referring to FIG. 6, computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Still referring to FIG. 6, computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

Still referring to FIG. 6, a user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Still referring to FIG. 6, computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for greenhouse gas tracking, comprising:
at least a processor and a memory communicatively connected to the at least a processor, the memory containing instructions configuring the at least a processor to:
receive a first set of greenhouse gas data comprising data on energy used in electronic invoicing of a transport from a first greenhouse gas source;
receive a second set of greenhouse gas data from a second greenhouse gas source;
receive a plurality of emission training data, wherein the plurality of emission training data correlates emission contributing factors to greenhouse gas data;
determine a first greenhouse gas metric associated with the first greenhouse gas source;
determine a second greenhouse gas metric associated with the second greenhouse gas source;
determine emission contributing factors for the first greenhouse gas source and the second greenhouse gas source;
determine an ideal greenhouse gas metric, wherein determining the ideal greenhouse gas metric comprises comparing the first greenhouse gas metric to the second greenhouse metric by optimizing an objective function, wherein optimizing the objective function comprises minimizing a loss function as a function of objectives, wherein the objectives comprise transport times;

calculate, as a function of the first greenhouse gas metric and the second greenhouse gas metric, a greenhouse gas ratio;
train a greenhouse emission machine-learning model using the plurality of emission training data, wherein the greenhouse emission machine-learning model is configured to input emission contributing factors, and output at least an estimated greenhouse gas emission;
predict the at least an estimated greenhouse gas emission as a function of the greenhouse emission machine-learning model;
provide greenhouse gas emission feedback through a display as a function of the greenhouse gas ratio, the at least an estimated greenhouse gas emission and the ideal greenhouse gas metric; and
provide a pollutant profile through the display, wherein the pollutant profile comprises:
a plurality of pollutant profile categories comprising at least a type of pollutant emissions; and
a pollutant emission breakdown of a plurality of pollutant contributing factors.

2. The apparatus of claim 1, wherein the computing device is further configured to:
receive a plurality of training data, wherein the plurality of training data correlates greenhouse gas data to greenhouse gas ratios;
train a greenhouse gas machine-learning model using the plurality of training data, wherein the greenhouse gas machine-learning model is configured to input greenhouse gas data and output predicted greenhouse gas ratios; and
predict at least a greenhouse gas ratio using the greenhouse gas machine-learning model.

3. The apparatus of claim 1, wherein the at least a processor is further configured to display the first set of greenhouse gas data and the second set of greenhouse gas data on a graphical user interface (GUI).

4. The apparatus of claim 1, wherein the first greenhouse gas source comprises emissions from a transport vehicle.

5. The apparatus of claim 1, wherein the at least a processor is further configured to determine a transport path of a transport vehicle as a function of a greenhouse gas minimization function.

6. The apparatus of claim 1, wherein the second greenhouse gas source comprises carbon consumed by a user of a plurality of users.

7. The apparatus of claim 1, wherein the at least a processor is further configured to apportion an amount of a total amount of greenhouse gas emissions to each user of a plurality of users.

8. The apparatus of claim 1, wherein determining a first greenhouse gas metric associated with the first greenhouse gas source and determining a second greenhouse gas metric associated with the second greenhouse gas source comprises calculating a greenhouse gas conversion factor.

9. The apparatus of claim 1, wherein the at least a processor is further configured to communicate with a greenhouse gas database, wherein the greenhouse gas database comprises a plurality of user data, greenhouse gas data, and transport vehicle data.

10. The apparatus of claim 1, wherein the at least a processor is further configured to provide each user of the plurality of users with at least a greenhouse gas reduction plan.

11. A method of greenhouse gas tracking using a computing device, comprising:
receiving a first set of greenhouse gas data comprising data on energy used in electronic invoicing of a transport from a first greenhouse gas source;
receiving a second set of greenhouse gas data from a second greenhouse gas source;
receiving a plurality of emission training data, wherein the plurality of emission training data correlates emission contributing factors to greenhouse gas data;
determining a first greenhouse gas metric associated with the first greenhouse gas source;
determining a second greenhouse gas metric associated with the second greenhouse gas source;
determining emission contributing factors for the first greenhouse gas source and the second greenhouse gas source;
determining an ideal greenhouse gas metric, wherein determining the ideal greenhouse gas metric comprises comparing the first greenhouse gas metric to the second greenhouse metric by optimizing an objective function, wherein optimizing the objective function comprises minimizing a loss function as a function of objectives, wherein the objectives comprise transport times;
calculating, as a function of the first greenhouse gas metric and the second greenhouse gas metric, a greenhouse gas ratio;
training a greenhouse emission machine-learning model using the plurality of emission training data, wherein the greenhouse emission machine-learning model is configured to input emission contributing factors, and output at least an estimated greenhouse gas emission;
predicting the at least an estimated greenhouse gas emission as a function of the greenhouse emission machine-learning model;
providing greenhouse gas emission feedback through a display as a function of the greenhouse gas ratio, the at least an estimated greenhouse gas emission and the ideal greenhouse gas metric; and
providing a pollutant profile through the display, wherein the pollutant profile comprises:
a plurality of pollutant profile categories comprising at least a type of pollutant emissions; and
a pollutant emission breakdown of a plurality of pollutant contributing factors.

12. The method of claim 11, wherein calculating a greenhouse gas ratio further comprises:
receiving a plurality of training data, wherein the plurality of training data correlates greenhouse gas data to greenhouse gas ratios;
training a greenhouse gas machine-learning model on the plurality of training data, wherein the greenhouse gas machine-learning model is configured to input greenhouse gas data and output predicted greenhouse gas ratios; and
predicting at least a greenhouse gas ratio using the greenhouse gas machine-learning model.

13. The method of claim 11, wherein the computing device is further configured to display the first set of greenhouse gas data and the second set of greenhouse gas data on a graphical user interface (GUI).

14. The method of claim 11, wherein the first greenhouse gas source comprises emissions from a transport vehicle.

15. The method of claim 11, wherein the computing device is further configured to determine a transport path of a transport vehicle as a function of a greenhouse gas minimization function.

16. The method of claim 11, wherein the second greenhouse gas source comprises carbon consumed by a user of a plurality of users.

17. The method of claim 11, wherein the computing device is further configured to apportion an amount of a total amount of greenhouse gas emissions to each user of a plurality of users.

18. The method of claim 11, wherein determining a first greenhouse gas metric associated with the first greenhouse gas source and determining a second greenhouse gas metric associated with the second greenhouse gas source includes calculating a greenhouse gas conversion factor.

19. The method of claim 11, wherein the computing device is further configured to communicate with a greenhouse gas database, wherein the greenhouse gas database comprises a plurality of user data, greenhouse gas data, and transport vehicle data.

20. The method of claim 11, wherein the computing device is further configured to provide a user of a plurality of users with at least a greenhouse gas reduction plan.

* * * * *